(12) United States Patent
Imakita et al.

(10) Patent No.: US 8,039,411 B2
(45) Date of Patent: Oct. 18, 2011

(54) OPTICAL GLASS

(75) Inventors: Kenji Imakita, Tokyo (JP); Naoki Sugimoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 110 days.

(21) Appl. No.: 12/404,026

(22) Filed: Mar. 13, 2009

(65) Prior Publication Data

US 2009/0227439 A1 Sep. 10, 2009

Related U.S. Application Data

(63) Continuation of application No. PCT/JP2007/067603, filed on Sep. 10, 2007.

(30) Foreign Application Priority Data

Sep. 13, 2006 (JP) .................................. 2006-247622

(51) Int. Cl.
*C03C 3/068* (2006.01)
*C03C 3/095* (2006.01)
*C03C 3/091* (2006.01)

(52) U.S. Cl. ................. 501/78; 501/79; 501/64; 501/66
(58) Field of Classification Search .................... 501/64, 501/66, 78, 79
See application file for complete search history.

(56) References Cited

U.S. PATENT DOCUMENTS

| | | | |
|---|---|---|---|
| 4,084,978 A * | 4/1978 | Sagara | 501/63 |
| 4,612,295 A * | 9/1986 | Sagara | 501/51 |
| 5,744,409 A | 4/1998 | Hashimoto et al. | |
| 5,919,718 A * | 7/1999 | Hirota et al. | 501/64 |
| 6,413,894 B1 * | 7/2002 | Sato | 501/77 |
| 2005/0164864 A1 * | 7/2005 | Kasuga et al. | 501/78 |
| 2007/0232477 A1 * | 10/2007 | Fujiwara | 501/50 |
| 2008/0312062 A1 | 12/2008 | Sasai et al. | |
| 2008/0318758 A1 | 12/2008 | Imakita et al. | |
| 2009/0075806 A1 | 3/2009 | Imakita et al. | |
| 2009/0093357 A1 | 4/2009 | Sasai et al. | |

FOREIGN PATENT DOCUMENTS

| | | | |
|---|---|---|---|
| JP | 60221338 A | * | 11/1985 |
| JP | 01308843 A | * | 12/1989 |
| JP | 8-12368 | | 1/1996 |
| JP | 2000302479 A | * | 10/2000 |
| JP | 2002187735 A | * | 7/2002 |
| JP | 2003-176151 | | 6/2003 |
| JP | 2004-2178 | | 1/2004 |
| JP | 2005-206427 | | 8/2005 |
| JP | 2007137701 A | * | 6/2007 |

OTHER PUBLICATIONS

Office Action issued Dec. 16, 2010, in China Patent Application No. 200780034054.8 (with English translation).

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The present invention has an object to provide an optical glass which has middle refractive index and low dispersibility, a low yield point ($T_s$) and a liquidus temperature (L.T.) and excellent weather resistance, and is suitable for mold press molding. The present invention relates to an optical glass comprising, in mass % on oxide basis, $SiO_2$: 20 to 40%, $B_2O_3$: 10 to 30%, SrO: 10 to 30%, $Al_2O_3$: 5.5 to 15%, $La_2O_3$: 0.5 to 11%, $Li_2O$: 3 to 12%, CaO: 0 to 10%, BaO: 0 to 9.5%, and ZnO: 0 to 10%.

5 Claims, No Drawings

OPTICAL GLASS

TECHNICAL FIELD

The present invention relates to an optical glass suitable for precision press molding.

BACKGROUND ART

In recent years, a mold press molding method is widely used as a production method of an optical lens, having high productivity and low production cost. In this production method, a droplet-shaped preform glass heated to a temperature higher than a glass transition temperature is pressed using a pair of upper and lower molds each having a high precision surface, thereby realizing an optical lens having a desired shape.

In general, in a mold press production method, expensive release films are formed on the surfaces of molds in many cases in order to prevent fusion between the mold and a heated glass. However, those release films are liable to deteriorate when exposed to high temperature. As a result, the durability of the mold is decreased, and manufacturing costs are increased. To improve durability of a mold, an optical glass having a low yield point ($T_s$) and low-temperature softening properties is necessary.

The mold press molding method mostly uses a droplet-shaped preform glass obtained by cooling a dropped glass melt. However, in order to increase production yield of a preform glass, it is necessary to prevent devitrification of a glass during dropping through molding, which is the cause of yield lowering, and optical glass is also required to have a low liquidus temperature (L.T.).

In recent years, a so-called middle refractive index and low dispersion optical lens having a refractive index ($n_d$) of from 1.55 to 1.65 and an Abbe number ($v_d$) of from 55 to 65 is generally used in optical pickup of various optical disc systems such as CD and DVD, video cameras, digital cameras and the like. Demands of those commercial products are remarkably increasing. With the demands, an inexpensive and high quality optical glass for middle refractive index and low dispersion suitable for a press molding method is desired.

Barium crown glass type or heavy crown glass type glasses have conventionally been known as a middle refractive index and low dispersion glass having a refractive index ($n_d$) of from 1.55 to 1.65 and an Abbe number ($v_d$) of from 55 to 65. For example, many glasses of SK (SCHOTT AG, catalog name) type are described in "Glass Composition Data Book, 1991, The Glass Manufacturer's Association of Japan". However, those glasses generally have a high yield point exceeding 600° C., and are therefore not suitable for mold press molding.

To overcome this problem, it has been investigated to add an alkali oxide such as $Li_2O$, $Na_2O$ or $K_2O$ to those glasses. However, there is the problem that $SiO_2$—$B_2O_3$—BaO—$R_2O$ glass obtained by merely adding only an alkali oxide to the conventional $SiO_2$—$B_2O_3$—BaO glass has poor weather resistance.

In view of the above, addition of weather resistance improvement components as described below has been investigated. However, to realize practically sufficient weather resistance, the component must be added in a large amount, and as a result, there is the problem that other properties such as devitrification resistance and optical properties deteriorate. For example, Patent Document 1 proposes a glass comprising $SiO_2$—$B_2O_3$—BaO-$R_2O$ glass and added thereto, $TiO_2$ and $Nb_2O_5$. However, due to the addition of $TiO_2$ and $Nb_2O_5$ in large amounts, low dispersibility of refractive index cannot be realized. Furthermore, Patent Document 2 proposes an optical glass comprising $SiO_2$—$B_2O_3$—BaO—$R_2O$ glass and added thereto in a large amount, $Gd_2O_3$. However, there are the problems that devitrification resistance properties markedly deteriorate, and due to the addition of a large amount of $Gd_2O_3$ which is an expensive material, it increases costs.

On the other hand, Patent Document 3 proposes $SiO_2$—$B_2O_3$—SrO glass using SrO in place of BaO as an alkali earth oxide. This glass has a low yield point ($T_s$) and excellent weather resistance, and regarding optical properties, it has middle refractive index and low dispersion properties. However, there are the problems that a liquidus temperature (L.T.) is relatively high, and it is difficult to prepare a preform by a falling-drop method. A middle refractive index and low dispersion optical glass which has overcome those problems has been desired.

Patent Document 1: JP-A-6-107425
Patent Document 2: JP-A-2004-2178
Patent Document 3: JP-A-7-149536

DISCLOSURE OF THE INVENTION

Problems to be Solved by the Invention

The present invention has an object to provide an optical glass which has middle refractive index and low dispersibility, a low yield point ($T_s$) and a low liquidus temperature (L.T.) and excellent weather resistance, and is suitable for mold press molding.

Means for Solving the Problems

As a result of extensive and intensive investigations to achieve the above object, the present inventors have found that when $Al_2O_3$, $La_2O_3$ and the like are optimized as essential components in $SiO_2$—$B_2O_3$—SrO glass, the liquidus temperature (L.T.) can be considerably lowered while maintaining the yield point ($T_s$), weather resistance and optical properties comparable to those of the conventional $SiO_2$—$B_2O_3$—SrO glass.

The present invention provides an optical glass comprising, in mass % on oxide basis;
 $SiO_2$: 20 to 40%
 $B_2O_3$: 10 to 30%
 SrO: 10 to 30%
 $Al_2O_3$: 5.5 to 15%
 $La_2O_3$: 0.5 to 11%
 $Li_2O$: 3 to 12%
 CaO: 0 to 10%
 BaO: 0 to 9.5%, and
 ZnO: 0 to 10%.

Advantageous Effects of the Invention

According to the composition of the present invention comprising $SiO_2$, $B_2O_3$, SrO, $Al_2O_3$, $La_2O_3$ and $Li_2O$ as essential components, an optical glass having the desired optical properties such as a refractive index $n_d$ and an Abbe number $v_d$ is obtained. Furthermore, according to the present invention, an optical glass having practically sufficient weather resistance and further having low-temperature softening properties suitable for mold press molding is obtained. As a result, the degree of deterioration of a film on a mold surface is reduced, and durability of a mold is improved, so that productivity is greatly improved. Furthermore, according to the present invention, an optical glass having a sufficiently low liquidus temperature (L.T.) is obtained. As a result, lowering of yield due to devitrification in molding a preform used in mold press molding is expected, and it becomes easy to produce a preform.

BEST MODE FOR CARRYING OUT THE INVENTION

The reasons for setting each component range in the glass of the present invention (hereinafter referred to as the "present glass") are as follows.

$SiO_2$ is a main component which constitutes a network of a glass, and is an essential component in the present glass. The $SiO_2$ content is 20 mass % (hereinafter, "mass %" is abbreviated as "%") or more for the purpose of stabilization of the glass and improvement in devitrification resistance and weather resistance of the glass. The $SiO_2$ content is more preferably 25% or more, and further preferably 30% or more. On the other hand, where the $SiO_2$ content is too large, refractive index is decreased, and it is difficult to obtain the desired refractive index. Therefore, in the present glass, the $SiO_2$ content is 40% or less. The $SiO_2$ content in the present glass is preferably 39% or less, and more preferably 38% or less.

Similar to $SiO_2$, $B_2O_3$ is a component which constitutes a net work of a glass, and is an essential component in the present glass. Where the $B_2O_3$ content is large, the weather resistance deteriorates. Therefore, the $B_2O_3$ content is 30% or less to obtain practically sufficient weather resistance. The $B_2O_3$ content is more preferably 27% or less, and further preferably 25% or less. Furthermore, $B_2O_3$ is a component to increase an Abbe number. The $B_2O_3$ content is 10% or more to have practically sufficient weather resistance and to obtain the desired optical properties and low-temperature softening properties. The $B_2O_3$ content is preferably 15% or more, and more preferably 17% or more.

SrO is a component to stabilize the glass while lowering a yield point ($T_s$), and is an essential component in the present glass. The SrO content is 10% or more to sufficiently obtain this effect. The SrO content is preferably 12% or more, and more preferably 15% or more. On the other hand, where the SrO content is too large, the refractive index is decreased. Therefore, the SrO content is 30% or less. The SrO content is preferably 25% or less, and more preferably 20% or less.

$Al_2O_3$ is a component effective to improve devitrification resistance and weather resistance, and is an essential component in the present glass. The $Al_2O_3$ content is 5.5% or more. The $Al_2O_3$ content is preferably 6% or more, and more preferably 6.5% or more. On the other hand, where the $Al_2O_3$ content exceeds 15%, the devitrification resistance of the glass considerably deteriorates. Therefore, the $Al_2O_3$ content in the present glass is 15% or less. The $Al_2O_3$ content is preferably 10% or less, and more preferably 9% or less.

$La_2O_3$ is a component to improve weather resistance of a glass, and is an essential component in the present glass. The $La_2O_3$ content is 0.5% or more. The $La_2O_3$ content is preferably 2% or more, and more preferably 4% or more. On the other hand, where the $La_2O_3$ content is too large, the devitrification resistance deteriorates. Therefore, the $La_2O_3$ content is 11% or less. The $La_2O_3$ content is preferably 9% or less, and more preferably 7% or less.

$Li_2O$ is a component to lower a yield point ($T_s$), and is an essential component in the present glass. The $Li_2O$ content is 3% or more to sufficiently obtain the effect. The $Li_2O$ content is preferably 5% or more, and more preferably 6.5% or more. On the other hand, where the $Li_2O$ content is too large, the weather resistance deteriorates. Therefore, the $Li_2O$ content is 12% or less. The $Li_2O$ content is preferably 9% or less, and more preferably 8% or less.

$Na_2O$ is a component to lower a yield point ($T_s$), and is an optional component in the present glass. The $Na_2O$ content is preferably 0.1% or more to sufficiently obtain the effect. On the other hand, where the $Na_2O$ content is too large, the weather resistance deteriorates. Therefore, the $Na_2O$ content is preferably 10% or less, more preferably 5% or less, and further preferably 1% or less.

$K_2O$ is a component to lower a yield point ($T_s$), and is an optional component in the present glass. Where the $K_2O$ content is too large, weather resistance deteriorates. Therefore, the $K_2O$ content is preferably 10% or less. The $K_2O$ content is more preferably 5% or less, and further preferably 1% or less.

ZnO is a component to stabilize a glass while maintaining weather resistance, and is an optional component in the present glass. The ZnO content is preferably 0.1% or more to sufficiently obtain the effect. The ZnO content is more preferably 0.5% or more, and further preferably 1% or more. On the other hand, where the ZnO content is too large, an Abbe number is decreased. Therefore, the ZnO content is preferably 10% or less. The ZnO content is more preferably 6% or less, and further preferably 3% or less.

In the present glass, part of SrO as the essential component can be substituted with BaO and CaO which are the same alkaline earth element. In other words, similar to SrO, BaO and CaO are components having the effect to stabilize a glass while lowering a yield point ($T_s$), and are optional components in the present glass. However, BaO and CaO have the effect to deteriorate weather resistance. Therefore, the BaO content is preferably 9.5% or less. The BaO content is more preferably 8% or less, and further preferably 7% or less. Similarly, the CaO content is preferably 10% or less. The CaO content is more preferably 5% or less, and further preferably 1% or less.

In the present glass, part of SrO as the essential component can be substituted with BaO and CaO which are the same alkaline earth element, as described above. In this case, the proportion of SrO content occupied in the total amount of alkaline earth oxide contents, that is, a value of SrO/(SrO+BaO+CaO) (hereinafter referred to as "SrO ratio"), is preferably 0.5 or more to balance the weather resistance with other properties. The SrO ratio in the present glass is more preferably 0.55 or more, and further preferably 0.6 or more.

In the present glass, $La_2O_3$ can be used as an essential component and BaO can be used as an optional component, to realize low dispersibility of optical properties. When both components are contained, the sum of the content of those components, i.e., $BaO+La_2O_3$ (hereinafter referred to as "total BaLa component"), is preferably 5% or more. The total BaLa component is more preferably 7% or more, and further preferably 9% or more.

On the other hand, where the total BaLa component is too large, the devitrification resistance of the glass deteriorates. Therefore, the total BaLa component is preferably 20% or less. The total BaLa component is more preferably 15% or less, and further preferably 13% or less.

$La_2O_3$ is a component to improve weather resistance, whereas BaO is a component to deteriorate the weather resistance. Therefore, where importance is attached to the weather resistance, it is preferred that a ratio of $La_2O_3$ content to BaO content, i.e., $BaO/La_2O_3$ (hereinafter referred to as "BaLa component ratio"), is decreased. The value of BaLa component ratio of 3 or less is preferred from the point of weather resistance. The value of BaLa component ratio is more preferably 2 or less, and further preferably 1.5 or less.

In the present glass, examples of the optional component for refining and the like include $Sb_2O_3$, $SnO_2$ and $A_2O_3$. In order that the effect is recognized, those components are contained in an amount of 0.1% or more, respectively. On the other hand, those components deteriorate devitrification resistance. Therefore, the content of those components is preferably 1% or less, respectively.

As optical properties of the present glass, the refractive index ($n_d$) is preferably 1.55 or more. The refractive index ($n_d$) is more preferably 1.57 or more, and particularly preferably 1.58 or more. On the other hand, to realize low dispersibility, the refractive index ($n_d$) of the present glass is preferably 1.65 or less. The refractive index ($n_d$) of the present glass is more preferably 1.63 or less, and further preferably 1.61 or less.

The present glass preferably has an Abbe number ($v_d$) of from 55 to 65. The Abbe number ($v_d$) is more preferably 58 or more, and further preferably 59 or more. On the other hand, the Abbe number ($v_d$) is more preferably 63 or less, and further preferably 62 or less. The relationship between the refractive index ($n_d$) and the Abbe number ($v_d$) is preferably that the Abbe number ($v_d$) is from 58 to 63 when the refractive index ($n_d$) is from 1.57 to 1.63. It is further preferred that the Abbe number ($v_d$) is from 59 to 62 when the refractive index ($n_d$) is from 1.58 to 1.61.

When the present glass has a yield point ($T_s$) of 600° C. or lower, it is preferred in that durability of a mold is improved, and it is liable to perform press molding. The yield point ($T_s$) of the present glass is more preferably 590° C. or lower, and further preferably 580° C. or lower.

When the present glass has a liquidus temperature (L.T.) of 900° C. or lower, yield at the time of preform molding is improved, which is preferred. The liquidus temperature (L.T.) is more preferably 850° C. or lower, and further preferably 800° C. or lower.

In the present description, the weather resistance is described in terms of the degree of change in transmittance which is one of optical properties under high temperature and humidity. Specifically, when reduction ratio of transmittance after holding a glass for 100 hours under high temperature and humidity environment of a temperature of 60° C. and a relative humidity of 90% (hereinafter referred to as "transmittance after holding") to transmittance of a glass before holding (hereinafter referred to as "transmittance before holding"), i.e., (transmittance before holding−transmittance after holding)/transmittance before holding (hereinafter referred to as "transmittance reduction ratio")), is 0.2 or less, such a glass is preferred as the present glass. The transmittance reduction ratio is more preferably 0.15 or less, and further preferably 0.1 or less.

EXAMPLES

[Preparation Method of Glass]

The corresponding oxide, carbonate, nitrate, hydroxide and the like were used as raw materials of each component. Specifically, boric acid was used as the raw material for $B_2O_3$, commercial available alumina and aluminum hydroxide were used as the raw material for $Al_2O_3$, and the corresponding carbonate and nitrate were used as the raw materials of an alkali oxide represented by $Li_2O$ and an alkaline earth oxide represented by SrO. Furthermore, the corresponding oxides were used as the raw materials of other components such as $SiO_2$ and $La_2O_3$. Raw materials of those components were weighed so as to be the chemical compositions shown in Tables 1 and 2. Those components were sufficiently mixed in a form of powder to obtain a mixed raw material. This was placed in a platinum crucible and melted at a melting temperature of 1,100 to 1,300° C. for 1 hour. The resulting glass melt was flown out of the crucible and molded in a plate. The plate was held at 490 to 540° C. for 4 hours to remove residual stress, and then annealed to room temperature at a cooling rate of 1° C./min to obtain an optical glass.

[Evaluation]

A refractive index ($n_d$) and an Abbe number ($v_d$) were obtained by measuring a glass block having a size of 20 mm×20 mm and a thickness of 10 mm, both surfaces being mirror polished, with a refractometer (a product of Kalnew Optical Industry Co., Ltd., trade name: KPR-2). The measurement value was obtained up to five places of decimals. The refractive index ($n_d$) was described by rounding to two decimal places, and the Abbe number ($v_d$) was described by rounding to one decimal place.

The yield point ($T_s$)/° C. was obtained by measuring a sample processed into a columnar shape having a diameter of 5 mm and a length of 20 mm with a thermo-mechanical analyzer (a product of MAC Science Co., Ltd., trade name: DIALTOMETER 5000) at a temperature rising rate of 5° C./min.

Weather resistance was evaluated as follows. Transmittance at a wavelength of 500 nm of a glass block having a size of 20 mm×20 mm and a thickness of 10 mm, both surfaces being mirror polished, was measured. The glass block was held in a thermo-hygrostat set to a temperature of 60° C. and a relative humidity of 90% for 100 hours, and transmittance thereof was again measured. Transmittance reduction ratio as described above was calculated, and the value was described in the Tables as weather resistance/%.

The liquidus temperature (L.T.)/C.° was measured as follow. A glass block of 10 mm×10 mm×10 mm was placed on a platinum alloy pan of Pt 95%-Au 5%, and held in an electric furnace set to high temperature of 700 to 1,000° C. for 1 hour. Observation was made with a microscope of 100 magnifications. The lowest temperature in temperatures at which crystal component was not observed was considered as a liquidus temperature.

The acid resistance was obtained based on Japanese optical Glass Industrial Standards (JOGIS) 06-1975 as follows. A glass sample was ground in a particle size of 420 to 590 μm. Mass corresponding to 1 $cm^3$ was weighed and placed in a platinum cage, and the cage was placed in a flask containing a nitric acid aqueous solution adjusted to 0.01N, and treated in a boiling water bath for 60 minutes. Mass reduction rate (mass %) of a glass powder after treatment was calculated.

The above results are shown in Tables 1 and 2 together with the chemical compositions. In the Tables, Runs 1 to 7 are the Examples of the present invention, and Runs 8 to 10 are the Comparative Examples. Run 8 is SK5 which is the conventional heavy crown glass. Comparing with Run 8, Runs 1 to 7 show markedly low yield points ($T_s$), which are suitable for press molding. Runs 9 to 10 are Examples 4 and 6 of JP-A-7-149536, respectively. When Runs 1 to 7 are compared with Runs 9 to 10, the yield points and weather resistance are the same level. However, the liquidus temperature (L.T.) is markedly lowered in Runs 1 to 7, and improvement in productivity in preform molding can be expected.

TABLE 1

|  |  | Run 1 | Run 2 | Run 3 | Run 4 | Run 5 |
|---|---|---|---|---|---|---|
| Composition/% | $SiO_2$ | 39.0 | 33.5 | 33.4 | 36.2 | 37.1 |
|  | $B_2O_3$ | 17.7 | 23.7 | 21.1 | 20.6 | 21.2 |
|  | SrO | 17.7 | 17.6 | 17.6 | 17.6 | 13.3 |
|  | $Al_2O_3$ | 7.2 | 7.2 | 7.3 | 7.2 | 7.3 |
|  | $La_2O_3$ | 4.8 | 4.8 | 4.9 | 10.8 | 4.9 |
|  | $Li_2O$ | 7.5 | 7.4 | 9.4 | 7.4 | 7.6 |
|  | CaO |  |  |  |  | 2.5 |
|  | BaO | 5.9 | 5.9 | 6.0 |  | 6.0 |
|  | ZnO |  |  |  |  |  |
|  | $TiO_2$ |  |  |  |  |  |
|  | $ZrO_2$ |  |  |  |  |  |
|  | $Sb_2O_3$ | 0.3 |  |  | 0.3 |  |
|  | $As_2O_3$ |  |  |  |  |  |
| SrO ratio |  | 0.75 | 0.75 | 0.66 | 1.00 | 0.61 |
| Total BaLa component |  | 10.7 | 10.7 | 10.9 | 10.8 | 10.9 |
| Proportion of BaLa component |  | 1.23 | 1.23 | 1.23 | 0 | 1.22 |
| $v_d$ |  | 60.6 | 61.3 | 60.0 | 60.2 | 60.9 |
| $n_d$ |  | 1.591 | 1.593 | 1.596 | 1.596 | 1.590 |
| $T_s$/° C. |  | 573 | 573 | 549 | 575 | 566 |
| Weather resistance/% |  | 3.5 | 7.2 | 11.0 | 6.1 | 6.8 |
| Luquidus temperature/° C. |  | 760 | 720 | 730 | 850 | 720 |
| Acid resistance/% |  | 0.65 | 0.78 | 0.83 | 0.74 | 0.80 |

TABLE 2

|  |  | Run 6 | Run 7 | Run 8 | Run 9 | Run 10 |
|---|---|---|---|---|---|---|
| Composition/% | $SiO_2$ | 36.5 | 35.8 | 38.6 | 42.0 | 44.0 |
|  | $B_2O_3$ | 20.8 | 20.7 | 14.9 | 24.0 | 23.0 |
|  | SrO | 15.4 | 17.6 |  | 22.8 | 17.1 |
|  | $Al_2O_3$ | 7.2 | 7.2 | 5.0 | 1.0 | 3.0 |
|  | $La_2O_3$ | 4.8 | 4.8 |  |  |  |
|  | $Li_2O$ | 7.5 | 7.4 |  | 7.0 | 7.0 |
|  | CaO |  |  |  |  | 3.0 |
|  | BaO | 5.9 | 6.5 | 40.2 |  |  |
|  | ZnO | 1.9 |  |  | 3.0 | 1.6 |
|  | $TiO_2$ |  |  |  |  | 0.2 |
|  | $ZrO_2$ |  |  |  |  | 1.0 |
|  | $Sb_2O_3$ | 0.3 |  | 0.1 | 0.2 |  |
|  | $As_2O_3$ |  |  | 1.0 |  |  |
| SrO ratio |  | 0.72 | 0.73 | 0 | 1.0 | 0.88 |
| Total BaLa component |  | 10.7 | 11.3 | 40.2 | 0 | 0 |
| Proportion of BaLa component |  | 1.23 | 1.35 | — | — | — |
| $v_d$ |  | 60.5 | 61.0 | 61.3 | 62.7 | 61.8 |
| $n_d$ |  | 1.590 | 1.593 | 1.589 | 1.583 | 1.579 |
| $T_s$/° C. |  | 572 | 571 | 705 | 556 | 564 |
| Weather resistance/% |  | 8.0 | 7.2 | — | 7.5 | 6.8 |
| Luquidus temperature/° C. |  | 740 | 770 | — | 940 | 920 |
| Acid resistance/% |  | 0.73 | 0.75 | — | 0.75 | 0.72 |

While the present invention has been described in detail and by reference to the specific embodiments thereof, it will be apparent to one skilled in the art that various modifications and changes can be made therein without departing from the spirit and scope thereof.

This application is based on Japanese Patent Application No. 2006-247622 filed Sep. 13, 2006, the disclosure of which is incorporated herein by reference in its entity.

Industrial Applicability

According to the present invention, an optical glass having the desired refractive index, yield point ($T_s$) and liquidus temperature (L.T.) and having excellent weather resistance is easily obtained. That is, because of having optical properties of middle refractive index and low dispersibility, having excellent weather resistance and having a low yield point (Ts) and a low liquidus temperature (L.T.), an optical glass excellent in press moldability and preform productivity can be provided.

The invention claimed is:

1. An optical glass comprising, in mass % on oxide basis;
$SiO_2$: 20 to 40%
$B_2O_3$: 10 to 30%
SrO: 10 to 30%
$Al_2O_3$: 5.5 to 15%
$La_2O_3$: 0.5 to 11%
$Li_2O$: 3 to 12%
CaO: 0 to 10%
BaO: 0 to 9.5%, and
ZnO: 0 to 10%,
the optical glass having a liquidus temperature (L.T.) of 900° C. or lower.

2. The optical glass as claimed in claim 1, wherein, in mass % on oxide basis, BaO+$La_2O_3$ is from 5 to 20%, BaO/$La_2O_3$ is 3 or less, and SrO/(SrO+BaO+CaO) is from 0.5 to 1.

3. The optical glass as claimed in claim 1, having a refractive index ($n_d$) of from 1.55 to 1.65 and an Abbe number ($v_d$) of from 55 to 65.

4. The optical glass as claimed in claim 1, having a yield point ($T_s$) of 600° C. or lower.

5. The optical glass as claimed in claim 1, having a transmittance reduction ratio after holding under environment of a temperature of 60° C. and a relative humidity of 90% for 100 hours of 0.2 or less.

* * * * *